(12) United States Patent
Røsten et al.

(10) Patent No.: US 7,613,570 B2
(45) Date of Patent: Nov. 3, 2009

(54) METHOD AND APPARATUS FOR DERIVING A CALIBRATION FILTER FOR ELECTROMAGNETIC DATA

(75) Inventors: Tage Røsten, Trondheim (NO); Lasse Amundsen, Trondheim (NO)

(73) Assignee: Statoil ASA, Stavanger (NO)

( * ) Notice: Subject to any disclaimer, the term of this patent is extended or adjusted under 35 U.S.C. 154(b) by 450 days.

(21) Appl. No.: 11/547,378

(22) PCT Filed: Apr. 1, 2005

(86) PCT No.: PCT/EP2005/051483

§ 371 (c)(1),
(2), (4) Date: Nov. 16, 2006

(87) PCT Pub. No.: WO2005/096020

PCT Pub. Date: Oct. 13, 2005

(65) Prior Publication Data

US 2008/0281524 A1     Nov. 13, 2008

(30) Foreign Application Priority Data

Apr. 3, 2004    (GB) ................................ 0407697.2

(51) Int. Cl.
*G06F 19/00* (2006.01)
(52) U.S. Cl. .......................................... 702/6; 324/301
(58) Field of Classification Search .................. 702/38, 702/65, 66, 150, 189; 340/870.19, 933, 934; 335/182; 324/301, 302, 312, 331, 348, 219, 324/244, 260
See application file for complete search history.

(56) References Cited

U.S. PATENT DOCUMENTS 5,996,414 A * 12/1999 Mercado ...................... 73/594
7,095,357 B1 * 8/2006 Johler .......................... 342/22

FOREIGN PATENT DOCUMENTS

| GB | 2 333 364 A | 7/1999 |
| GB | 2 384 068 A | 7/2003 |
| GB | 2 385 923 A | 9/2003 |

OTHER PUBLICATIONS

Ursin B., "Review of elastic and electromagnetic wave propagation in horizontally layered media," Geophysics, Society of Exploration Geophysicists, Tulsa, US, 48(8):1063-1081 (1983).

* cited by examiner

*Primary Examiner*—Edward Raymond
(74) *Attorney, Agent, or Firm*—Patterson, Thuente, Skaar & Christensen, P.A.

(57) ABSTRACT

A method of deriving a calibration filter for electromagnetic data is provided. The method comprises providing a source (21, 22) of electromagnetic radiation and subsequently measuring components of the source electromagnetic field (23, 24, 25) at a receiver when the source is sufficiently close to the receiver that the down-going signal dominates over the up-going signal reflected from features below the receiver. Such a measurement can be used in frequency domain analysis (26, 28, 29) to extract the down-going signal component and derive a calibration filter for the receiver. The method is repeated (27, 30) for each receiver used in an electromagnetic sounding survey.

34 Claims, 3 Drawing Sheets

METHOD AND APPARATUS FOR DERIVING A CALIBRATION FILTER FOR ELECTROMAGNETIC DATA

RELATED APPLICATIONS

This application claims priority to PCT Application No. PCT/EP2005/051483 filed Apr. 1, 2005, and Great Britain Application No. 0407697.2 filed Apr. 3, 2004, the disclosures of which are hereby incorporated by reference in their entireties.

FIELD OF THE INVENTION

The present invention relates to a method of deriving a calibration filter for electromagnetic data, and a method of processing electromagnetic data using such a derived filter. The present invention may be used, for example, in deriving a calibration filter for use in the field of electromagnetic seabed logging.

BACKGROUND OF THE INVENTION

The electromagnetic seabed logging (EM-SBL) technique is a new hydrocarbon exploration tool based on electromagnetic data, and is disclosed in Eidesmo et al., (2002) "Sea Bed Logging, a new method for remote and direct identification of hydrocarbon filled layers in deepwater areas", The Leading Edge, 20, No. 3, 144-152 and in Ellingsrud et al., (2002) "Remote sensing of hydrocarbon layers by seabed logging SBL: Results from a cruise offshore Angola", First Break, 21, No. 10, 972-982. EM-SBL is a special application of controlled-source electromagnetic (CSEM) sounding. CSEM sounding has been used successfully for a number of years to study ocean basins and active spreading centres. SBL is the first application of CSEM for remote and direct detection of hydrocarbons in marine environments. The two first successful SBL surveys published were offshore West Africa (Eidesmo et al. and Ellingsrud et al. above) and offshore mid-Norway, Røsten et al., (2003) "A Seabed Logging Calibration Survey over the Ormen Lange gas field", EAGE, 65$^{th}$ Ann. Internat. Mtg., Eur. Assoc. Geosc. Eng., Extended Abstracts, P058. Both studies were carried out in deep water environments (greater than 1,000 meter water depth).

SUMMARY OF THE INVENTION

The method uses a horizontal electrical dipole (HED) source that emits a low frequency electromagnetic signal into the underlying seabed and downwards into the underlying sediments. Electromagnetic energy is rapidly attenuated in the conductive subsurface sediments due to water-filled pores. In high-resistance layers such as hydrocarbon-filled sandstones and at a critical angle of incidence, the energy is guided along the layers and attenuated to a lesser extent. Energy refracts back to the seabed and is detected by electromagnetic receivers positioned thereupon. When the source-receiver distance (i.e. the offset) is of the order of 2 to 5 times the depth of the reservoir, the refracted energy from the resistive layer will dominate over directly transmitted energy. The detection of this guided and refracted energy is the basis of EM-SBL.

The thickness of the hydrocarbon-filled reservoir should be at least 50 m to ensure efficient guiding along the high-resistance layer and the water depth should ideally be greater than 500 m to prevent contributions from air waves known as ghosts.

The electromagnetic energy that is generated by the source is spread in all directions and the electromagnetic energy is rapidly attenuated in conductive subsea sediments. The distance to which the energy can penetrate into the subsurface is mainly determined by the strength and frequency of the initial signal, and by the conductivity of the underlying formation. Higher frequencies result in greater attenuation of the energy and hence a lower penetration depth. The frequencies adopted in EM-SBL are therefore very low, typically 0.25 Hz. The electric permittivity can be neglected due to the very low frequencies, and the magnetic permeability is assumed to be that of a vacuum, i.e. a non-magnetic subsurface. Although extremely low frequencies are used in EM-SBL, the fact that the technique is based on current flow or diffusion rather than electromagnetic wave propagation means that the range and resolution of the technique is not restricted by theoretical calculations of wavelengths.

In terms of numbers, a hydrocarbon-filled reservoir typically has a resistivity of a few tens of ohm-meters or more, whereas the resistivity of the over- and under-lying sediments is typically less than a few ohm-meters. The propagation speed is medium-dependent. In seawater, the speed is approximately 1,700 m/s (assuming a frequency of 1 Hz and a resistivity of 0.3 ohm-m), whereas a typical propagation speed of the electromagnetic field in subsea sediments is about 3,200 m/s (assuming the same frequency and a resistivity of 1.0 ohm-m). The electromagnetic field in a high-resistance hydrocarbon-filled layer propagates at a speed of around 22,000 m/s (50 ohm-m resistivity and 1 Hz frequency). The electromagnetic skin depths for these three cases are approximately 275 m, 500 m and 3,600 m, respectively.

The electromagnetic receivers may be placed individually on the seabed, each receiver measuring two horizontal and orthogonal components of both electric and magnetic fields. The HED source consists of two electrodes approximately 200 m apart, in electrical contact with the seawater. The source transmits a continuous and periodic alternating current signal, with a fundamental frequency in the range of 0.05-10 Hz. The peak-to-peak AC ranges from zero to several hundred amps. The height of the source relative to the seabed should be much less than the electromagnetic skin depth in seawater to ensure good coupling of the transmitted signal into the subsurface, e.g. around 50-100 m. There are several ways of positioning the receivers on the seabed. Usually, the receivers are placed in a straight line. Several such lines can be used in a survey and the lines can have any orientation with respect to each other, for example a number of lines may be crossed.

The environment and apparatus for acquiring EM-SBL data are illustrated in FIG. 1. A survey vessel 1 tows the electromagnetic source 2 along and perpendicular to the lines of receivers 3, and both in-line (transverse magnetic) and broad-line (transverse electric) energy can be recorded by the receivers. The receivers on the seabed 4 record data continuously while the vessel tows the source at a speed of 1-2 knots. The EM-SBL data are densely sampled at the source side, typically sampled at 0.04 s intervals, and coarsely sampled at the receiver side. A typical receiver separation distance is approximately 500-2,000 m. Standard processing and interpretation of the acquired data are therefore performed in the common receiver domain rather than in the common shot domain.

The EM-SBL data are acquired as a time series and then processed using a windowed discrete Fourier series analysis (see, for example, Jacobsen and Lyons (2003) "The Sliding DFT", IEEE Signal Proc. Mag., 20, No. 2, 74-80) at the transmitted frequency, i.e. the fundamental frequency or a harmonic thereof. After processing, the data can be displayed as magnitude versus offset (MVO) or phase versus offset (PVO) responses.

The combination of electric and magnetic measurements can be used to decompose the electromagnetic data into up-going and down-going waves. This is known as electromagnetic wavefield separation, or up-down decomposition. In particular, electromagnetic wavefield separation at the seabed can be used to identify and subsequently discriminate or attenuate down-going air waves in EM-SBL data. Additionally, down-going magnetotellurics (MT) are eliminated by electromagnetic wavefield separation. There are usually variations in coupling effects and differences in transfer functions of electric and magnetic receiver stations. Hence, the measurements must be properly calibrated in order to correctly combine the electric and magnetic measurements into faithful vector representations.

According to a first aspect of the invention, there is provided a method as defined in the appended claim 1.

Further aspects and embodiments of the invention are defined in the other appended claims.

It is thus possible to provide a technique which permits improved determination of an optimal calibration filter for electromagnetic data. The technique is independent of the Earth's structure, and no information about the Earth is required. The technique only requires measurements of the electric and magnetic fields when the source-receiver distance is close to minimum. Such a calibration filter may be adopted in processing electromagnetic data to separate up-going and down-going components of the data and remove down-going ghosts and MT.

BRIEF DESCRIPTION OF THE DRAWINGS

For a better understanding of the present invention and in order to show how the same may be carried into effect, preferred embodiments of the invention will now be described, by way of example, with reference to the accompanying drawings in which.

DETAILED DESCRIPTION OF THE DRAWINGS

Figure 1:
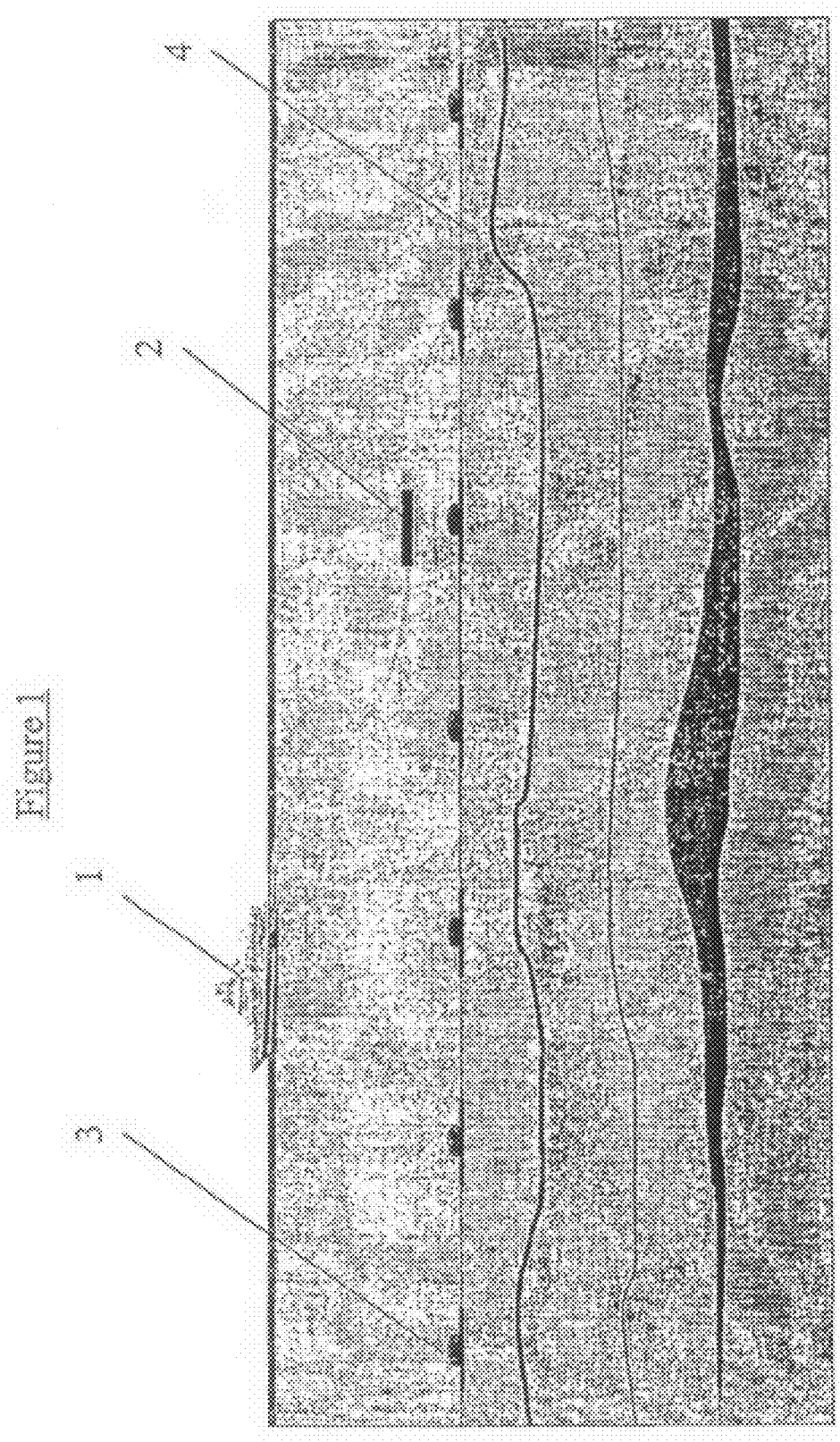
FIG. 1 illustrates the environment and apparatus for the acquisition of EM-SBL data.

The embodiments described herein provide a technique for deriving a calibration filter for EM-SBL data. It is assumed that the electric receivers are well-coupled, and a frequency dependent calibration filter for the magnetic receivers is determined. The technique is equally applicable in the reverse case, i.e. assuming that the magnetic receivers are well-coupled and determining a calibration filter for the electric receivers. Without loss of generality, the wavefield separation of the electric field (rather than the magnetic field) is considered. The present technique uses the direct signal, i.e. the signal that propagates directly from the electromagnetic source to the electromagnetic receivers. It is preferable for the source to be located above, or directly above, the receivers. The technique may be fully automated and data driven.

The technique will now be described with reference to electromagnetic receivers disposed on the seabed, although it will be appreciated that this arrangement is purely exemplary. The receivers may be disposed in relation to the electromagnetic source in any manner such that the source and receivers are sufficiently proximate that the magnitude of the up-going field is negligible compared to that of the down-going field.

For EM-SBL zero-offset data is a good approximation of purely down-going waves. In practice, this requires the use of electromagnetic receivers with large dynamic ranges, e.g. 32 bit analogue to digital converters.

In the frequency domain, the up-going component of the scalar electric field at the seabed, $E_{x,y}^U(\omega)$, is related to the recorded scalar electric field, measured in the x and y directions, $E_{x,y}(\omega)$, and the recorded scalar magnetic field, $H_{x,y}(\omega)$:

$$E_x^U(\omega) = \frac{1}{2}[E_x(\omega) - A(\omega)H_y(\omega)]$$

and $$E_y^U(\omega) = \frac{1}{2}[E_y(\omega) + A(\omega)H_x(\omega)],$$

where $A(\omega)$ is a decomposition filter and $\omega$ is the angular frequency. The corresponding down-going components are:

$$E_{x,y}^D(\omega) = E_{x,y} - E_{x,y}^U$$

The vertical component of the scalar electric field $E_z(\omega)$ is approximately zero directly beneath the source in a typical electromagnetic data acquisition survey. The corresponding magnetic field expressions may be found by application of Maxwell's equations. For vertically incident waves, $A(\omega)$ is given by $$A(\omega) = \sqrt{\frac{\mu}{\varepsilon + i\sigma/\omega}},$$

where $\mu$ is the magnetic permeability, $\varepsilon$ is the electric permittivity, and $\sigma$ is the electric conductivity. When the technique described herein is applied to EM-SBL, it may be assumed that the magnetic permeability is that of free space, i.e. a non-magnetic material. The electric permittivity can be considered negligible because of the low frequencies at which EM-SBL is performed. The electric conductivity of the sea water may be measured experimentally, although such measurements are not necessarily undertaken at the location of every receiver. The electric conductivity of the shallow overburden of the seabed is likewise a measurable parameter, but it is impractical to measure and it is preferable to avoid requiring its value.

In order for the above expressions for $E_{x,y}^U(\omega)$ to hold, the electric and magnetic field components must be calibrated. Application of a frequency dependent calibration filter $B(\omega)$ to the magnetic field gives the following expression for the up-going electric field:

$$E_x^U(\omega) = \frac{1}{2}[E_x(\omega) - A(\omega)B(\omega)H_y(\omega)] \quad (1)$$

and $$E_y^U(\omega) = \frac{1}{2}[E_y(\omega) + A(\omega)B(\omega)H_x(\omega)]. \quad (2)$$

The frequency dependent calibration filter is obtained by eliminating the up-going direct signal.

According to a first embodiment, the frequency dependent calibration filter $B(\omega)$ is obtained by applying a discrete Fourier transform to a localised window of the recorded electric and magnetic time series when the electromagnetic source is located above and/or close to the electromagnetic receiver stations. In this localised time window, the recorded energy will be strongly dominated by the down-going direct signal; the up-going energy from the subsurface will be negligible. When the source-receiver distance is near minimum, the measurements are dominated by the down-going waves at the seabed. A limit on the source-receiver separation for which the technique is useful is approximately 1,000 m.

In this embodiment, a known decomposition filter $A(\omega)$, either with parameters above or below the seabed, is implemented to determine $B(\omega)$. This is achieved by setting Equations 1 and 2 to zero, with $\tilde{E}_{x,y}(\omega)$ and $\tilde{H}_{x,y}(\omega)$ being representative measurements of the down-going electric and magnetic signals in the frequency domain, respectively. This therefore gives two expressions for the calibration filter:

$$B(\omega) = \frac{\tilde{E}_x(\omega)}{A(\omega)\tilde{H}_y(\omega)}$$

and $$B(\omega) = -\frac{\tilde{E}_y(\omega)}{A(\omega)\tilde{H}_x(\omega)}.$$

When decomposition is effected above the seabed, a value of the electric conductivity of the seawater is required, as described above. The technique works well if the reflection coefficient of the seawater-seabed interface is less than about one-third.

When decomposition is effected below the seabed, a value of the electric conductivity of the shallow overburden of the seabed is required. Performing the decomposition directly below the surface of the seabed is optimal. This is due to the fact that the reflection coefficients between the layers in the overburden are generally quite small, resulting in the down-going source signal around zero-offset dominating over up-going signals from the subsurface.

According to a second embodiment, an effective calibration filter $\tilde{B}(\omega)$, constructed from the "true" calibration filter $B(\omega)$ and an unknown decomposition filter $A(\omega)$, can be estimated. This is achieved by setting expressions (1) and (2) to zero, and rewriting $\tilde{B}(\omega)=A(\omega)B(\omega)$ as an effective calibration filter. This therefore gives two expressions for the effective calibration filter:

$$\tilde{B}(\omega) = \frac{\tilde{E}_x(\omega)}{\tilde{H}_y(\omega)}$$

and $$\tilde{B}(\omega) = -\frac{\tilde{E}_y(\omega)}{\tilde{H}_x(\omega)}.$$

Stabilised solutions of these equations are, for example:

$$\tilde{B}(\omega) = \frac{\tilde{E}_x(\omega)\tilde{H}_y^*(\omega)}{\tilde{H}_y(\omega)\tilde{H}_y^*(\omega)+\lambda} \tag{3}$$

and $$\tilde{B}(\omega) = -\frac{\tilde{E}_y(\omega)\tilde{H}_x^*(\omega)}{\tilde{H}_x(\omega)\tilde{H}_x^*(\omega)+\lambda}, \tag{4}$$

where * denotes a complex conjugate operation and $\lambda$ is a general stabilization constant.

The calibration filters can be estimated for several localised time windows, where the recorded energy will be strongly dominated by the down-going direct signal. Different solutions can be merged by linear (stacking) or non-linear combinations.

The effective calibration filter may also be expressed in the time domain as:

$$\tilde{b}(t)=e_x(t)*h_y^{-1}(t)$$

and $$\tilde{b}(t)=-h_y(t)*h_x^{-1}(t),$$

where e(t) and h(t) are the electric and magnetic time series around zero offset, the −1 superscript denoting an inverse filter and * denoting convolution. It is computationally preferable to work in the frequency domain, although the time domain calibration is included here for completeness.

Applying the effective calibration filter $\tilde{B}(\omega)$ implicitly corresponds to applying the decomposition directly below the surface of the seabed which, as described above, is the optimal location for applying the decomposition. Although this technique works provided that the down-going wave is of greater magnitude than the up-going wave, it is most effective when the magnitude of the up-going wave is less than about one-third of the magnitude of the down-going wave (i.e. the reflection coefficients between the layers in the overburden is less than about one-third).

In the first embodiment of the invention, with a known decomposition filter $A(\omega)$, the electromagnetic parameters need to be known either directly above or below the seabed.

In the second embodiment of the invention, $\tilde{B}(\omega)$ includes $A(\omega)$ and hence no knowledge about the electromagnetic parameters of the seabed is required.

The calibration filter obtained by either of the two above described embodiments can be applied to data recorded at the receivers during an EM-SBL data acquisition session. With adequate calibration of the electromagnetic receivers, the down-going waves may subsequently be removed by determining the form of the up-going waves.

Figure 2:
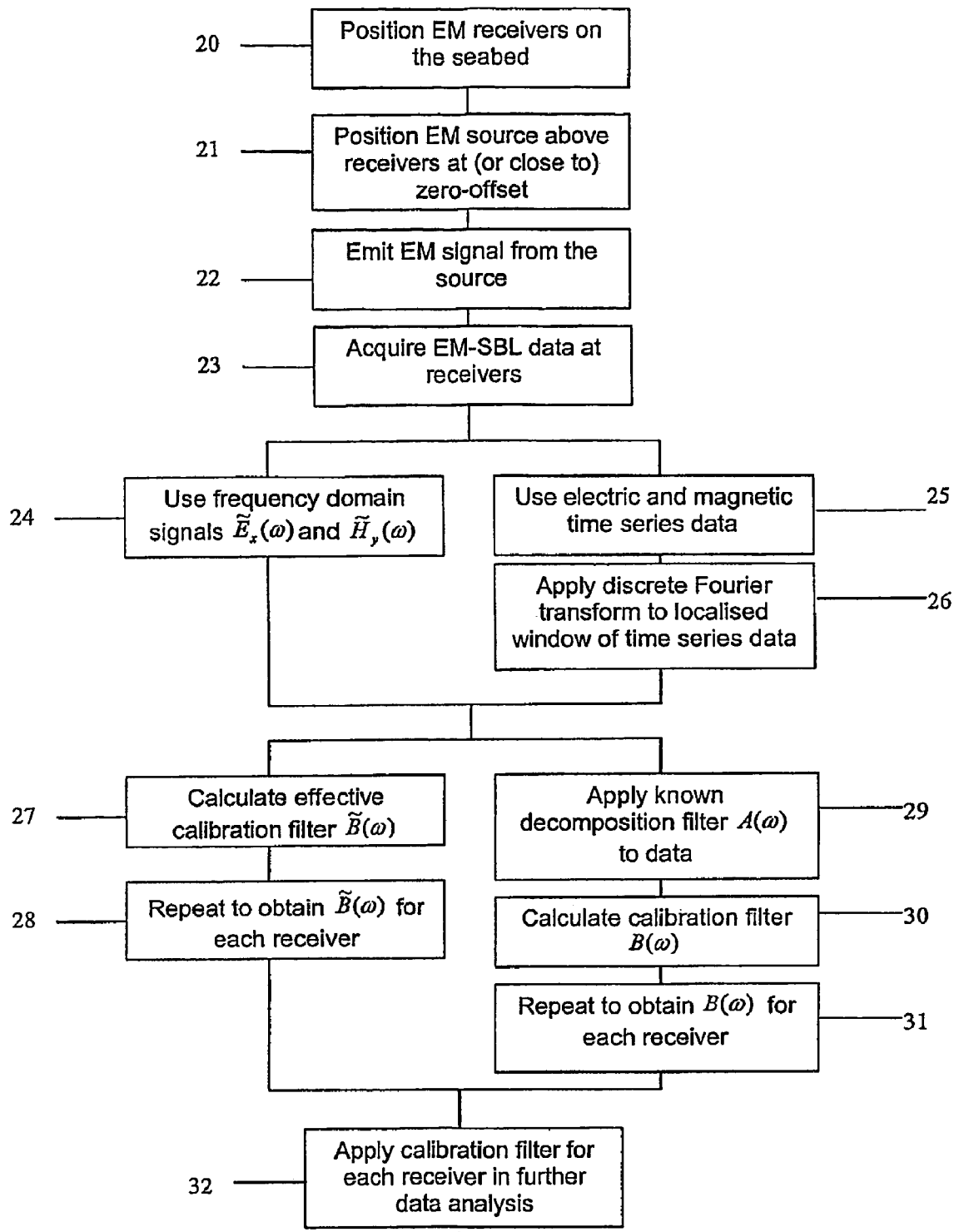
FIG. 2 is a flow diagram illustrating a method of deriving a calibration filter in accordance with an embodiment of the present invention.

The methods of the above-described embodiments are outlined in the flow diagram of FIG. 2. At step 20, the electromagnetic receivers are positioned on the seabed, and at step 21 the source is disposed at or close to zero-offset above the first receiver. When the source is emitting (step 22), the receiver in question measures the electric and magnetic components of the signal in the frequency domain (step 24). In practice, a localised window of the time series data obtained at step 25 is subjected to a discrete Fourier transform at step 26 to achieve the electric and magnetic components of the signal in the frequency domain.

The right-hand path of FIG. 2 shows the method of the first embodiment. A known decomposition filter $A(\omega)$ is applied to the data at step 29. The "true" calibration filter $B(\omega)$ is then obtained at step 30. This process is repeated to obtain the calibration filters for each receiver (step 31).

The left-hand path of FIG. 2 shows the method of the second embodiment. The effective calibration filter is determined in accordance with Equation 3 or 4 above (step 27). This process is repeated to ascertain the calibration filter for each receiver (step 28).

Either at a later stage, or simultaneously with the calibration readings, the EM-SBL survey is performed (step 23) and the acquired data modified to remove the down-going component of the source signal in accordance with the calibration filters as part of the further data analysis (step 32), yielding the MVO or PVO responses as previously described.

The data processing methods described above may be embodied in a program for controlling a computer to perform the technique. The program may be stored on a storage medium, for example hard or floppy discs, CD or DVD-recordable media or flash memory storage products. The program may also be transmitted across a computer network for example the Internet or a group of computers connected together in a LAN.

Figure 3:
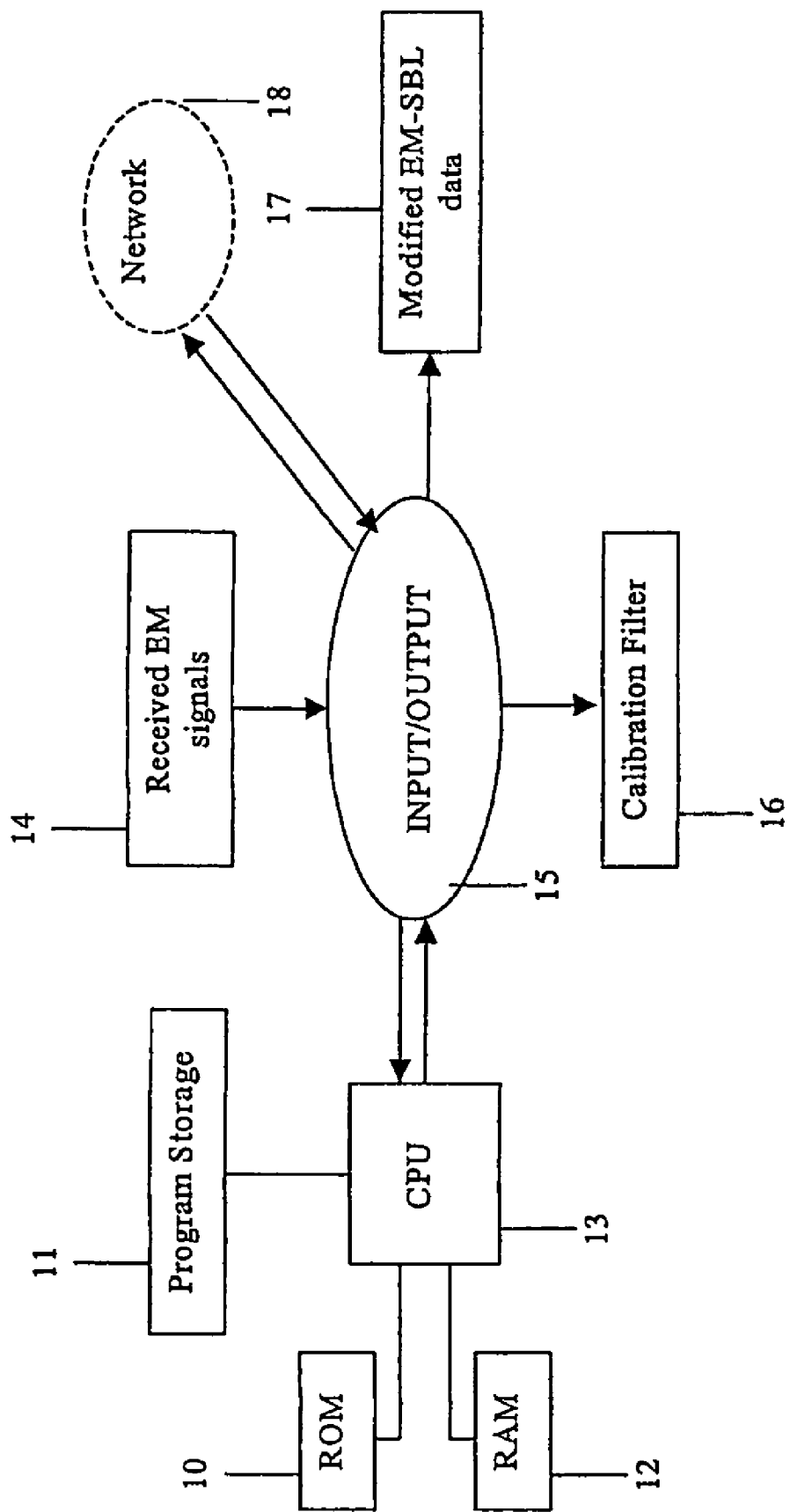
FIG. 3 is a block schematic diagram of an apparatus for performing the method of FIG. 2.

The schematic diagram of FIG. 3 illustrates a central processing unit (CPU) 13 connected to a read-only memory (ROM) 10 and a random access memory (RAM) 12. The CPU is provided with data 14 from the receivers via an input/output mechanism 15. The CPU then determines the calibration filer 16 in accordance with the instructions provided by the program storage (11) (which may be a part of the ROM 10). The program itself, or any of the inputs and/or outputs to the system may be provided or transmitted to/from a communications network 18, which may be, for example, the Internet. The same system, or a separate system, may be used to modify the EM-SBL data to remove the down-going signals, resulting in modified EM-SBL data 17 which may be further processed.

It will be appreciated by the skilled person that various modifications may be made to the above embodiments without departing from the scope of the present invention, as defined in the appended claims.

The invention claimed is:

1. A method of deriving a calibration filter for electromagnetic data, comprising the steps of: generating electromagnetic radiation at a source; measuring at least one component of the electromagnetic field provided by the source at the at least one receiver when the source is sufficiently close to the at least one receiver for the magnitude of a down-going electromagnetic field to be sufficiently greater than that of an up-going electromagnetic field to allow the derivation of a calibration filter; and deriving from the measurement a calibration filter for the at least one receiver for use in processing electromagnetic data.

2. A method as claimed in claim 1, wherein the magnitude of the up-going electromagnetic field is less than about one-third of the magnitude of the down-going electromagnetic field.

3. A method as claimed in claimed in 1, wherein the source is positioned above the at least one receiver during the measuring step.

4. A method as claimed in claim 3, wherein the source is positioned directly above the at least one receiver during the measuring step.

5. A method as claimed in claim 1, wherein the at least one receiver is disposed on the seabed.

6. A method as claimed in claim 1, wherein the electromagnetic radiation produced by the source propagates into the seabed.

7. A method as claimed in claim 1, wherein the at least one receiver is for use in electromagnetic seabed logging (EM-SBL).

8. A method as claimed in claim 1, wherein the calibration filter is derived for a magnetic receiver within the at least one receiver.

9. A method as claimed in claim 1, wherein the calibration filter is derived for an electric receiver within the at least one receiver.

10. A method as claimed in claim 1, wherein the calibration filter is obtained from a frequency domain analysis of measurements made at the at least one receiver.

11. A method as claimed in claim 1, wherein the derived calibration filter is an effective calibration filter $\tilde{B}(\omega)$ obtained using the equation $\tilde{B}(\omega)=\tilde{E}_x(\omega)|\tilde{H}_y(\omega)$, where $\tilde{E}_x(\omega)$ and $\tilde{H}_y(\omega)$ are measurements made at the at least one receiver of the electric and magnetic signals in the frequency domain, in orthogonal x and y directions, respectively, related by the expression $$E_x^U(\omega) = \frac{1}{2}\left[\tilde{E}_x(\omega) - \tilde{B}(\omega)\tilde{H}_y(\omega)\right] = 0.$$

12. A method of deriving a calibration filter, wherein the calibration filter is a combination of different effective calibration filters obtained using a method according to claim 11.

13. A method as claimed in claim 1, wherein the derived calibration filter is an effective calibration filter $\tilde{B}(\omega)$ obtained using the equation $\tilde{B}(\omega)=-\tilde{E}_y(\omega)|\tilde{H}_x(\omega)$, where $\tilde{E}_y(\omega)$ and $\tilde{H}_x(\omega)$ are measurements made at the at least one receiver of the electric and magnetic signals in the frequency domain, in orthogonal x and y directions, respectively, related by the expression $$E_y^U(\omega) = \frac{1}{2}\left[\tilde{E}_y(\omega) - \tilde{B}(\omega)\tilde{H}_x(\omega)\right] = 0.$$

14. A method as claimed in claim 1, wherein the derived calibration filter is an effective calibration filter $\tilde{b}(t)$ obtained using the equation $\tilde{b}(t)=e_x(t)*h_y^{-1}(t)$, where $e_x(t)$ and $h_y(t)$ are measurements made at the at least one receiver of the electric and magnetic signals in the time domain, in orthogonal x and y directions, respectively.

15. A method of deriving a calibration filter, wherein the calibration filter is a combination of different effective calibration filters obtained using a method according to claim 14.

16. A method as claimed in claim 1, wherein the derived calibration filter is an effective calibration filter $\tilde{b}(t)$ obtained using the equation $\tilde{b}(t)=-e_y(t)*h_x^{-1}(t)$, where $e_y(t)$ and $h_x(t)$ are measurements made at the at least one receiver of the electric and magnetic signals in the time domain, in orthogonal x and y directions, respectively.

17. A method as claimed in claim 1, wherein the derived calibration filter is a true calibration filter $B(\omega)$ obtained using the equation $B(\omega)=\tilde{E}_x(\omega)|\tilde{H}_y(\omega)|A(\omega)$, where $\tilde{E}_x(\omega)$ and $\tilde{H}_y(\omega)$ are frequency domain measurements made at the at least one receiver of the electric and magnetic signals in the frequency domain, in orthogonal x and y directions, respectively, and $A(\omega)$ is a known decomposition filter, related by the expression $$E_x^U(\omega) = \frac{1}{2}\left[\tilde{E}_x(\omega) - A(\omega)B(\omega)\tilde{H}_y(\omega)\right] = 0.$$

18. A method of deriving a calibration filter, wherein the calibration filter is a combination of different effective calibration filters obtained using a method according to claim 17.

19. A method as claimed in claim 1, wherein the derived calibration filter is a true calibration filter $B(\omega)$ obtained using the equation $B(\omega)=-\tilde{E}_y(\omega)|\tilde{H}_x(\omega)|A(\omega)$, where $\tilde{E}_y(\omega)$ and $\tilde{H}_x(\omega)$ are measurements made at the at least one receiver of the electric and magnetic signals in the frequency domain, in orthogonal x and y directions, respectively, and $A(\omega)$ is a known decomposition filter related by the expression $$E_y^U(\omega) = \frac{1}{2}\left[\tilde{E}_y(\omega) + A(\omega)B(\omega)\tilde{H}_x(\omega)\right] = 0.$$

20. A method as claimed in claim 1, wherein the calibration filter is derived through application of a frequency domain transform to a localised window of the measured data in which the magnitude of the down-going field is greater than the magnitude of the up-going field.

21. A program for controlling a computer to perform a method as claimed in claim 1.

22. A program as claimed in claim 21 stored on a storage medium.

23. Transmission of a program as claimed in claim 21 across a communications network.

24. A computer programmed to perform a method as claimed in claim 1.

25. A method of processing electromagnetic data using a calibration filter, the method comprising:
   deriving a calibration filter in accordance with a method as claimed in claim 1;
   applying the calibration filter to electromagnetic data subsequently recorded at the at least one receiver; and
   separating the up-going and down-going components of the electromagnetic data.

26. A method as claimed in claim 25, wherein the down-going component is removed.

27. A method as claimed in claim 25, wherein the data is EM-SBL data, and the at least one receiver is disposed upon the seabed.

28. Data obtained from a method of processing electromagnetic data as claimed in claim 25.

29. Data as claimed in claim 28 when stored on a storage medium.

30. A computer programmed to perform a method as claimed in claim 25.

31. An apparatus for deriving a calibration filter for electromagnetic data, the apparatus comprising:
   a source of electromagnetic radiation;
   at least one receiver arranged to measure at least one component of the electromagnetic field provided by the source when the source is sufficiently close to the at least one receiver for the magnitude of a down-going electromagnetic field to be sufficiently greater than that of an up-going electromagnetic field to allow the derivation of a calibration filter; and
   means for deriving from the measurement a calibration filter for the at least one receiver for use in processing electromagnetic data.

32. A program for controlling a computer to perform a method as claimed in claim 31.

33. A program as claimed in claim 32 stored on a storage medium.

34. Transmission of a program as claimed in claim 32 across a communications network.

* * * * *